United States Patent [19]

Zmyslowski et al.

[11] Patent Number: 4,855,947

[45] Date of Patent: Aug. 8, 1989

[54] MICROPROGRAMMABLE PIPELINE INTERLOCKS BASED ON THE VALIDITY OF PIPELINE STATES

[75] Inventors: Allan J. Zmyslowski, Sunnyvale; Robert M. Maier, San Jose, both of Calif.

[73] Assignee: Amdahl Corporation, Sunnyvale, Calif.

[21] Appl. No.: 54,947

[22] Filed: May 27, 1987

[51] Int. Cl.[4] .......................... G06F 9/28; G06F 9/38; G06F 13/14

[52] U.S. Cl. .................................................. 364/200

[58] Field of Search ... 364/200 MS File, 900 MS File

[56] References Cited

U.S. PATENT DOCUMENTS

| | | | |
|---|---|---|---|
| 4,566,103 | 1/1986 | Sato et al. ............................. | 371/12 |
| 4,585,058 | 8/1987 | Lee et al. ............................. | 364/200 |
| 4,594,655 | 10/1986 | Hao et al. ............................. | 364/200 |
| 4,701,915 | 10/1987 | Kitamura et al. ..................... | 371/13 |
| 4,710,866 | 12/1987 | Zolnowsky et al. ................. | 364/200 |
| 4,722,046 | 1/1988 | Kasrazadeh et al. ................ | 364/200 |

Primary Examiner—Archie E. Williams, Jr.
Assistant Examiner—Ayni Mohamed
Attorney, Agent, or Firm—Fliesler, Dubb, Meyer & Lovejoy

[57] ABSTRACT

An interlock of an instruction processing pipeline in a data processing system responsive to the validity of the pipeline stages within the instruction unit pipeline under microprogram control, is provided. Thus, a microprogram can provide for the release of a particular pipeline stage based on a selected characteristic of the valid signals generated by other stages of the pipeline. An interlock control signal is generated by a decode of a field in a microinstruction stored in a control store RAM or through hardwired decoding.

18 Claims, 4 Drawing Sheets

MICROPROGRAMMABLE PIPELINE INTERLOCKS BASED ON THE VALIDITY OF PIPELINE STATES

CROSS-REFERENCES TO RELATED APPLICATIONS

This invention is related to the following U.S. patent applications which were owned at the time of invention and are currently owned by the same assignee as the present invention. Each of the following applications is incorporated by reference as is fully set forth in the present application.

(1) CENTRAL PROCESSOR ARCHITECTURE IMPLEMENTING DETERMINISTIC EARLY CONDITION CODE ANALYSIS USING DIGIT-BASED, SUB-TERM COMPUTATION AND SELECTIVE SUB-TERM COMBINATION; inventors, A. Zmyslowski, P. Hom; filed Oct. 17, 1986; Ser. No. 920,515.

(2) MICROSTORE STRUCTURE SUPPORTING BACKED-UP AND NORMAL MICROFIELDS; inventors, A. Zmyslowski, B. Tang, R. Maier; filed Oct. 17, 1986; Ser. No. 920,508.

BACKGROUND OF HE INVENTION

1. Field of the Invention

The present invention is related to pipelined central processing units typical of the mainframe class of computer systems. In particular, the present invention provides a design allowing interlocking of the pipeline of a central processing unit in a selected state based on the validity of other pipeline states under microprogram control.

2. Description of Related Art

Modern data processing machines typically have an instruction processing unit which includes a number of stages in a pipeline configuration. Using a pipeline of a number of stages for execution of instructions allows the machine to overlap processing of more than one instruction at a time in the instruction processing unit. The number of stages of a given instruction which are performed before the next instruction in the instruction stream begins processing, is called the pipeline offset. Thus, if stage two of one instruction is performed in parallel with stage one of the following instruction, the pipeline has a one-cycle offset. If stage three of one instruction is performed in parallel with stage one of the following instruction in the instruction stream, the pipeline has a two-cycle offset. The pipeline offset is an important factor defining the speed at which instructions are supplied to the instruction processing unit during normal operation of the computer.

The pipeline offset also defines a state relationship between succeeding operations in the pipeline. Thus, if a dependent instruction requires the completion of a certain process by a previous instruction in the pipeline, the pipeline state relationship defines the timing in which the processing of the previous instruction must complete before beginning the dependent instruction. Some instructions in the pipeline may not be able to meet the timing requirements defined by the pipeline offset. For instance, a dependent instruction may require data or addresses generated in a pipeline stage that is more than the pipeline offset ahead of the dependent instruction. Therefore it is desirable to provide a microcode controlled interlock to the pipeline to delay processing of the dependent instruction in the pipe until the needed process is complete.

Previous techniques for delaying the pipeline to meet edge conditions that could not conform to the pipeline offset included the insertion of idle instructions causing a "no operation" flow within the instruction unit. Thus, if an N-cycle delay is required, N idle flows are inserted. This approach requires a microstore location for the no-op flows. In view of the expense of microstore locations in a high performance mainframe processing machine, this is an undesirable approach to providing a microprogrammable pipeline delay.

The model 5860 mainframe computer manufactured by Amdahl Corporation provides a microprogrammable scratch register interlock (SRI) which allows an execution unit process to factor into the release of the first state of the instruction processing unit pipeline. The pipeline of the 5860 includes five stages designated G—B—L—E—W, where the execution unit processes during the L and E stages. The operation of the SRI is illustrated in diagram in Table 1.

TABLE 1

| OP1 | G | B | L | E | W | | |
|---|---|---|---|---|---|---|---|
| OP2 | | G | G | B | L | E | W |
| Set SRI | G | | | | | | |
| SRI | | G | | | | | |
| Release | | | L | | | | |

The first instruction designated OP1 in the instruction processing unit creates conditions to interlock the G-state of the second instruction, designated OP2. Thus, as shown in Table 1, OP1 decodes the instruction to set the scratch register interlock in its G-state. The SRI is set in the B-state causing OP2 to delay until the release signal is asserted. OP1 proceeds to the execution unit processing in the L-cycle from which the release signal is generated. When the release signal is generated, OP2 proceeds with processing. This diagram shows the case in which the release signal is asserted in the L-state; it is also possible in the SRI implementation to assert the signal in the E-cycle from the execution unit.

It should be noted that the SRI was not designed into the model 5860 for the delay function shown above. Rather, its original purpose was to allow the execution unit to access a scratch register file which existed in the instruction unit. The delay function was an additional feature provided by the interlock.

The SRI interlock, while it functions suitably for certain conditions, does not provide the flexibility of totally selectable microprogrammable control. In addition, because the interlock requires a process in the execution unit to factor into the release of the first state of the instruction processing unit pipeline, complicated signal processing is required. For instance, the time required to propagate the release signal from the execution unit to the instruction unit could violate cycle time requirements of faster machines. Also, error analysis and maintenance procedures are made more complex with the SRI approach.

Assuming that no cycle time problem existed with the SRI approach, a programmable delay could be created by having a no-op flow instruct the execution unit to assert the release signal as shown in Table 2.

TABLE 2

|        | D | A | B | X | W |   |   |   |
|--------|---|---|---|---|---|---|---|---|
| NO-OP  | D | A | B | X | W |   |   |   |
| OP1    |   | D | A | B | X | W |   |   |
| OP2    |   |   | D | D | A | B | X | W |
| Set SRI |  |   |   |   |   |   |   |   |
| SRI    |   |   |   |   |   |   |   |   |
| Release |  |   |   |   |   |   |   |   |

Table 2 illustrates a pipeline in which the states are designated D—A—B—X—W, where the execution unit performs in the X stage only. Thus, the first instruction, designated NO-OP, would set the SRI in its A cycle, interlock the D-stage in its B-cycle and generate the release signal in its X-cycle from the execution unit. If the NO-OP flow of Table 2 could be used to perform some useful work other than merely setting the SRI, it might be a suitable approach to implementing a programmable delay. However, the exposure to cycle time violations that arise from using an execution unit process in the release of an instruction processing unit stage, make this type of interlock risky. Further, for a pipeline that includes a number of stages preceding the stage during which the execution unit processes the instruction, the offset of the SRI type interlock becomes more inflexible.

SUMMARY OF THE INVENTION

Accordingly, the present invention provides a pipeline delay interlock based on the validity of states in the pipeline for delaying the pipeline a selected number of stages.

In a data processing machine that includes an instruction processing unit having a plurality of stages in a pipeline configuration that executes a stream of instructions, a pipeline validity interlock apparatus is provided. If processing of the Nth stage of a dependent instruction is dependent on processing on the Mth stage of a previous instruction in the instruction stream, where M—N is greater than the pipeline offset, the interlock apparatus provides for a delay of M—N stages in the processing of the dependent instruction under microprogram control. The delay is responsive to validity logic in the instruction processing unit in each stage of the pipeline that generates a stage valid control signal indicating current processing of a valid instruction in the corresponding stage. A release enabling logic, in communication with the Nth stage and the validity logic and connected to receive a delay interlock signal, is provided for enabling an Nth stage release signal in response to the characteristic of the stage valid control signals identified by the delay interlock signal. The delay interlock signal is generated by an interlock control logic responsive to instructions in the instruction stream. Stages in the instruction unit pipeline are responsive to corresponding stage release signals to release a current instruction and proceed with processing of a following instruction.

In one aspect, the invention provides decoding logic, receiving instructions in the instruction stream for decoding an instruction to generate a microprogram instruction that includes a pipeline delay interlock field specifying the characteristics of the stage valid control signals for enabling release of a subsequent dependent instruction in the instruction stream.

According to the present invention, a programmable pipeline delay can be implemented, which requires no additional microflows or microstore locations in either the instruction unit or the execution unit to accomplish.

Further, it increases the maintainability and reliability over the scratch register interlock approach of the prior art, since the instruction unit and execution unit are not required to communicate signals concerning operation in their respective units between each other. Finally, the pipeline delay interlock eliminates the dependence on the stage in which the execution unit processes the instruction setting the interlock to provide greater flexibility in selecting on the stage during which the release enable signal is supplied for the dependent instructions.

DESCRIPTION OF THE PREFERRED EMBODIMENT

With reference to the drawings, a detailed description of a preferred embodiment of the present invention is provided.

Figure 1:
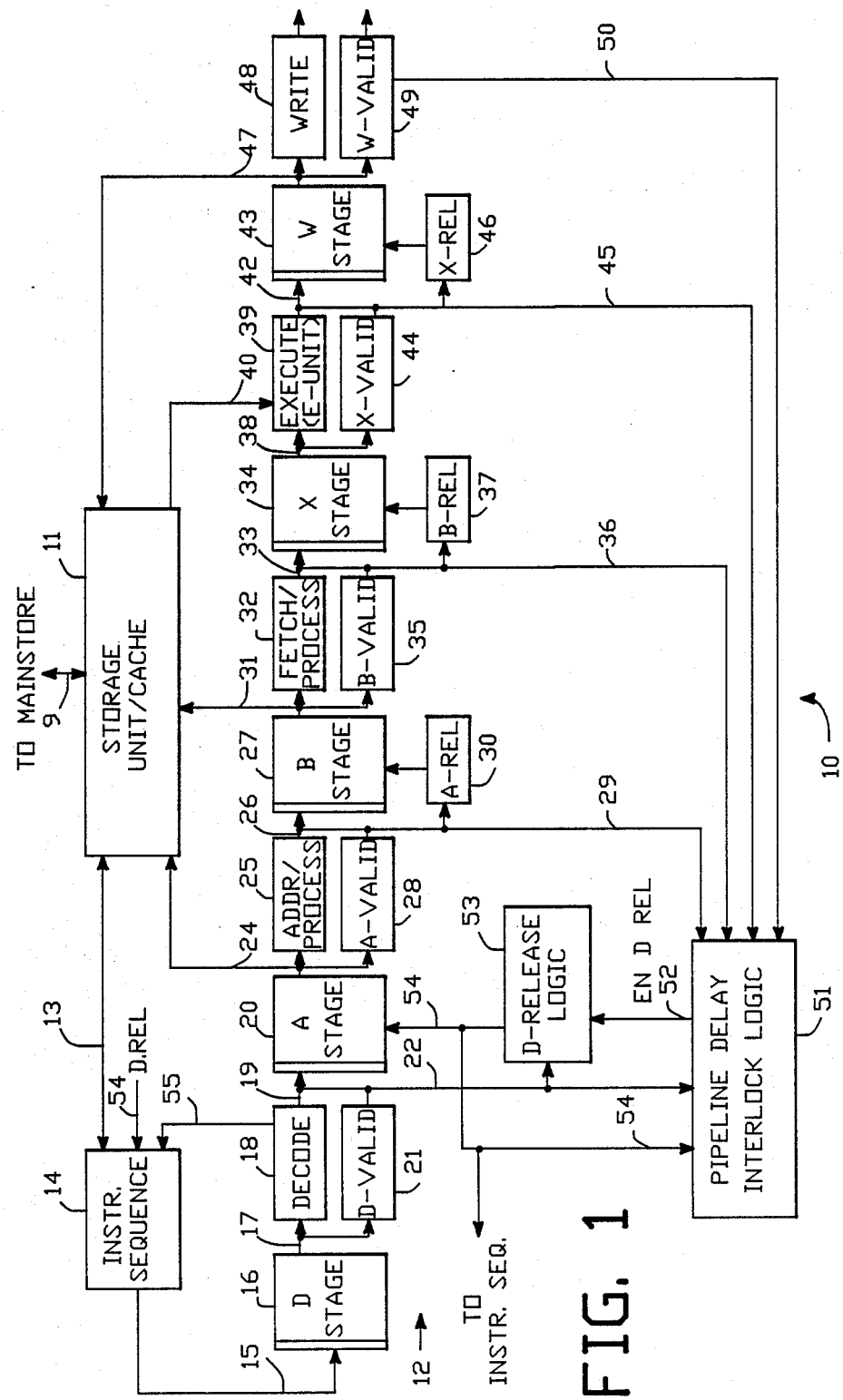
FIG. 1 is a schematic block diagram of a central processing unit of a data processing machine implementing the present invention.

With reference to FIG. 1, a central processing unit 10 of a mainframe data processing machine is described. The central processing unit 10 includes a storage unit 11 with a high speed cache that provides instructions and operands for processing in the instruction unit pipeline 12. The storage unit/cache 11 supplies instructions from the cache across bus 13. Bus 13 communicates through instruction sequencing controls 14 across bus 15 to the first stage of the instruction processing unit pipeline 12. The pipeline includes five stages for the processing of instructions. The first stage (D) involves decoding of instructions supplied in the instruction stream across line 15. The first stage of the pipeline 12 is schematically represented by register 16. The output of register 16 is supplied across line 17 to decoding apparatus 18. The output of the decoding apparatus 18 is supplied across lines 19 as an input to the second stage which is schematically represented by the register 20. Also, during the D stage, the output of the register 16 is supplied across line 17 to D stage valid logic 21. The D stage valid logic generates a D stage valid control signal on line 22 indicating the current processing of a valid instruction in the D stage. The output of the D valid stage signal is also supplied in combination with other information from the decoding apparatus 18 to a D cycle release logic 53. The D-REL signal 54 along with control signals from the decode logic 18 on line 55 are received by the instruction sequencer 14 to determine when a new instruction will be presented to the D stage 16.

In the second stage (A), addresses for accessing the storage unit cache are supplied. Thus, the output of the A register 20 is supplied on line 24 to logic 25 which controls addressing and other functions. The output of the addressing logic 25 is supplied on line 26 to the following stage 27. Also in the A cycle, the output of the A-register 20 is supplied on line 24 to A stage valid logic 28 and to the storage unit/cache 11. The output of the A stage valid logic is supplied on line 29 in combination with other output from the address apparatus 25 to an A release logic 30.

During the following stage (B) of the pipeline, operands are fetched from the storage unit/cache 11. The output of the B stage register 27 is supplied on line 31 to the storage unit/cache 11 and to the fetching and other B state logic 32. The output of the fetching logic 32 is supplied on line 33 to the fourth stage (X) register 34. Also during the B stage, the output of the B register 27 is supplied to B valid logic 35. The output of the B valid logic is supplied on line 36 to an B stage release logic 37.

During the fourth stage of the pipeline (X), control fields generated in response to the instruction are supplied to the execution unit 39 across line 38 where a designated function is executed. The execution unit 39 receives operands from the storage unit/cache 11 across line 40. The output of the execution unit 39 is supplied on line 42 to the fifth stage (W), shown by register 43. Also in the X stage, the output of the register 34 is supplied on line 38 to X stage valid logic 34. The X stage valid logic generates an X stage valid control signal on line 45 indicating current processing of a valid instruction in the X stage to an X cycle release logic 46.

In the W stage, the results of the execution unit process are written to the storage unit/cache 11. Thus, the output of the W register 43 is supplied on line 47 to write logic 48 and to the storage unit/cache 11. Also, the output of the W register 43 is supplied on line 47 to a W stage valid logic 49 which generates a W stage valid control signal on line 50.

The storage unit/cache 11 communicates with the main storage system across bus 9 to maintain an active set of instructions and operands in the cache according to well known processes.

It can be seen that the instruction unit pipeline 12 in the central processing unit 10 shown in FIG. 1 includes five stages. The pipeline offset in the preferred embodiment is one stage. Thus, there may be a different microinstruction in the instruction stream operating in each of the five stages of the pipeline during any machine cycle during normal processing.

For some instructions, however, it is desirable to delay processing in the D stage 16 for more than the pipeline offset of one stage. The instruction unit pipeline 12 therefore includes pipeline delay interlock logic 51. The pipeline delay interlock logic 51 receives the stage valid control signals on lines 29, 36, 45 and 50 from the A stage valid logic 28, B stage valid logic 35, X stage valid logic 44 and W stage valid logic 49, respectively. In addition, the pipeline delay interlock logic 51 receives an interlock control signal from the decode apparatus 18 along with the D stage valid logic on line 22. The output of the pipeline delay interlock logic 51 is an enable D release signal on line 52. The enable D release signal is supplied to the D release logic 53 which generates the D stage release signal on line 54. The D stage release signal on line 54 is supplied to the instruction sequences 14 and to the A stage 20 of the pipeline and to the pipeline delay interlock logic 51. The implementation shown in FIG. 1 provides pipeline delay interlock logic 51 for the D stage of the instruction unit pipeline 12. As suits a particular application, a user could implement the pipeline delay interlock logic that is responsive to the stage validity control signals for any stage N, where N equal 1 to 5, of the five stage instruction unit pipeline 12.

Figure 2:
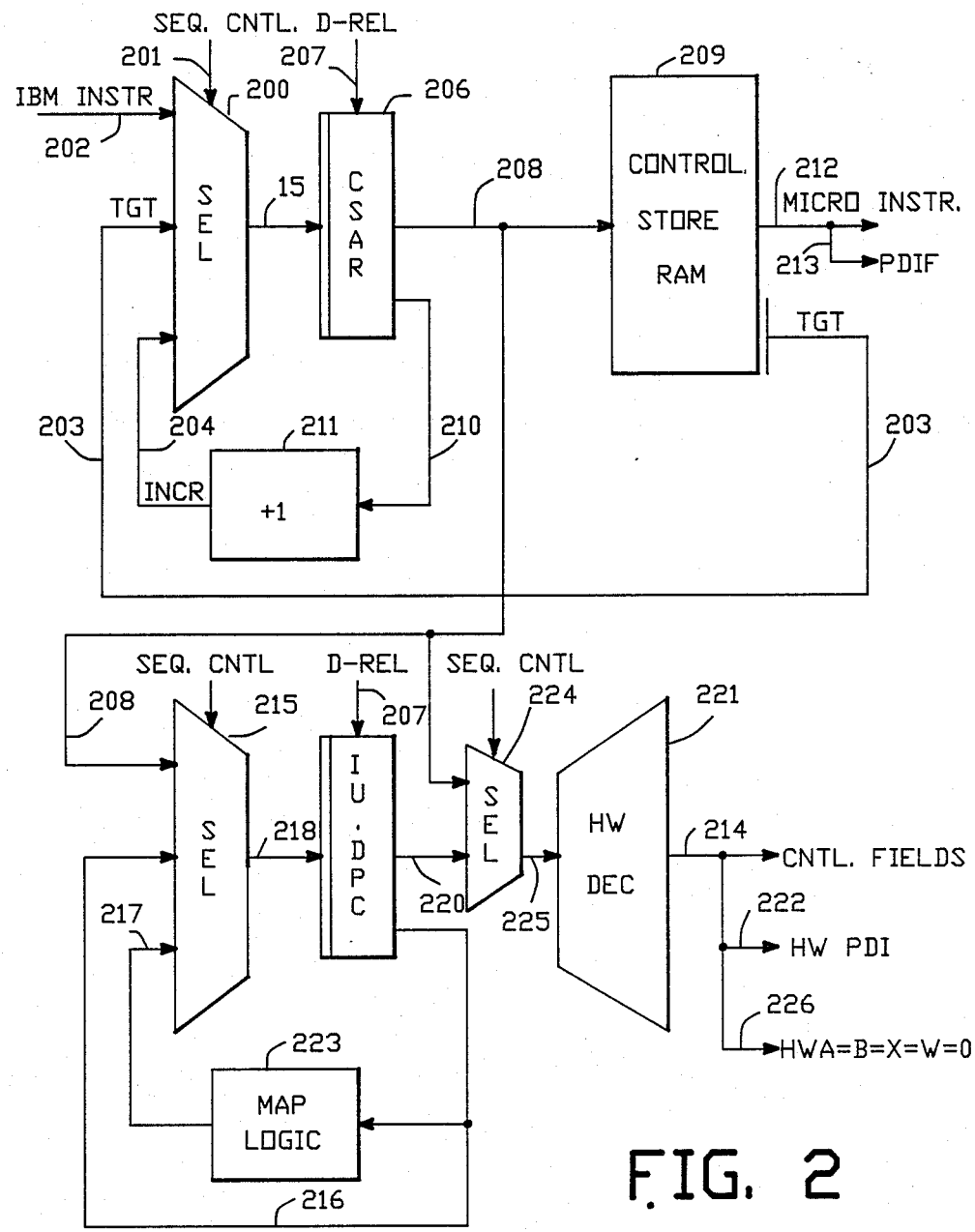
FIG. 2 is a schematic block diagram illustrating portions of the decoding function performed during the first stage of the instruction unit pipeline for the machine illustrated in FIG. 1.

A portion of the instruction sequencing apparatus 14 and the decode apparatus 18 in FIG. 1 is illustrated in FIG. 2. A stream of microinstruction addresses is supplied on line 15 at the output of a selector 200 in response to sequencing control signals on line 201. The input to the selector 200 includes, for instance, the opcode portion of an IBM standard 370 architecture instruction on line 202, a target microinstruction address to implement microinstruction branch conditions on line 203, and an incremented microinstruction address on line 204. The output Of the selector is supplied to the control store address register CSAR 206 in the D stage of the instruction unit pipeline, as indicated by the D release control signal 207. The output of the control store address register 206 is supplied on line 208 to a control store RAM 209. Also, the output of the control store address register is supplied on line 210 through an incrementor 211 to provide the incremented address on line 204 to the address selector 200. The control store RAM stores microinstructions at locations that are addressed from the control store address register across line 208. The microinstructions are supplied as output on line 212. For some microinstructions, one field provides a target address on line 203 for supply to the address selector 200. According to the present invention, the microinstruction may also include a pipeline delay interlock field PDIF on line 213.

The microinstructions in the control store RAM 209 make up microprograms. They are programmable because a microprogrammer can alter the contents of the control store RAM in order to implement new instructions or to change the operation of existing instructions. The microinstructions on line 212 are passed down the instruction unit pipeline through control points which effect processing in the pipeline according to the needs of the particular instruction. As can be seen, a given IBM equivalent instruction on line 202 may result in a sequence of flows of the instruction unit pipeline, with following control store addresses being supplied from target addresses out of the control store RAM or address incrementing logic 211.

In addition to the programmable microinstructions on line 212, the decoding apparatus also operates to supply hard wired control fields on line 214. The hard wired control fields are controlled in response to IBM instruction opcodes loaded into the CSAR 206 via line 208 through an I-unit internal op-code selector 215. The I-unit internal op-code selector 215 receives, in addition to the control store address on line 202, a fed-back internal opcode on line 216 or a mapped internal opcode on line 217. The output of the selector 215 is supplied on line 218 to an I-unit internal op-code register 219 in the D stage of the instruction unit pipeline as indicated by the D release signal on line 207. The internal op-code is supplied on line 220 to decode selector 224 along with the CSAR 206 output on line 208. The selected opcode is supplied on line 225 to a hard wired decoder 221 which generates the hard wired control fields. According to the present invention, the hard wired control fields on line 214 include a hard wired pipeline delay interlock signals HW PDI on line 222 and an HW A=B=X=W=0 on line 226.

The mapped internal opcode on line 217 is supplied through a mapping logic 223 from the output of the internal op-code register 219. Mapping logic 223 works to rearrange the internal opcode in register 219 according to predefined mathematical equations.

The internal opcode selector 215 also modifies the format of the internal opcode such as by appending control fields to the internal opcode to adapt it to the implementation of the hard wired decoder 221.

The pipeline delay interlock field PDIF on line 213 and the hard wired pipeline delay interlock signal HW PDI on lines 222 and HW A=B=X=W=0 on line 226 correspond to the control signals supplied on line 22 to the pipeline delay interlock logic 51 of FIG. 1.

Figure 3:
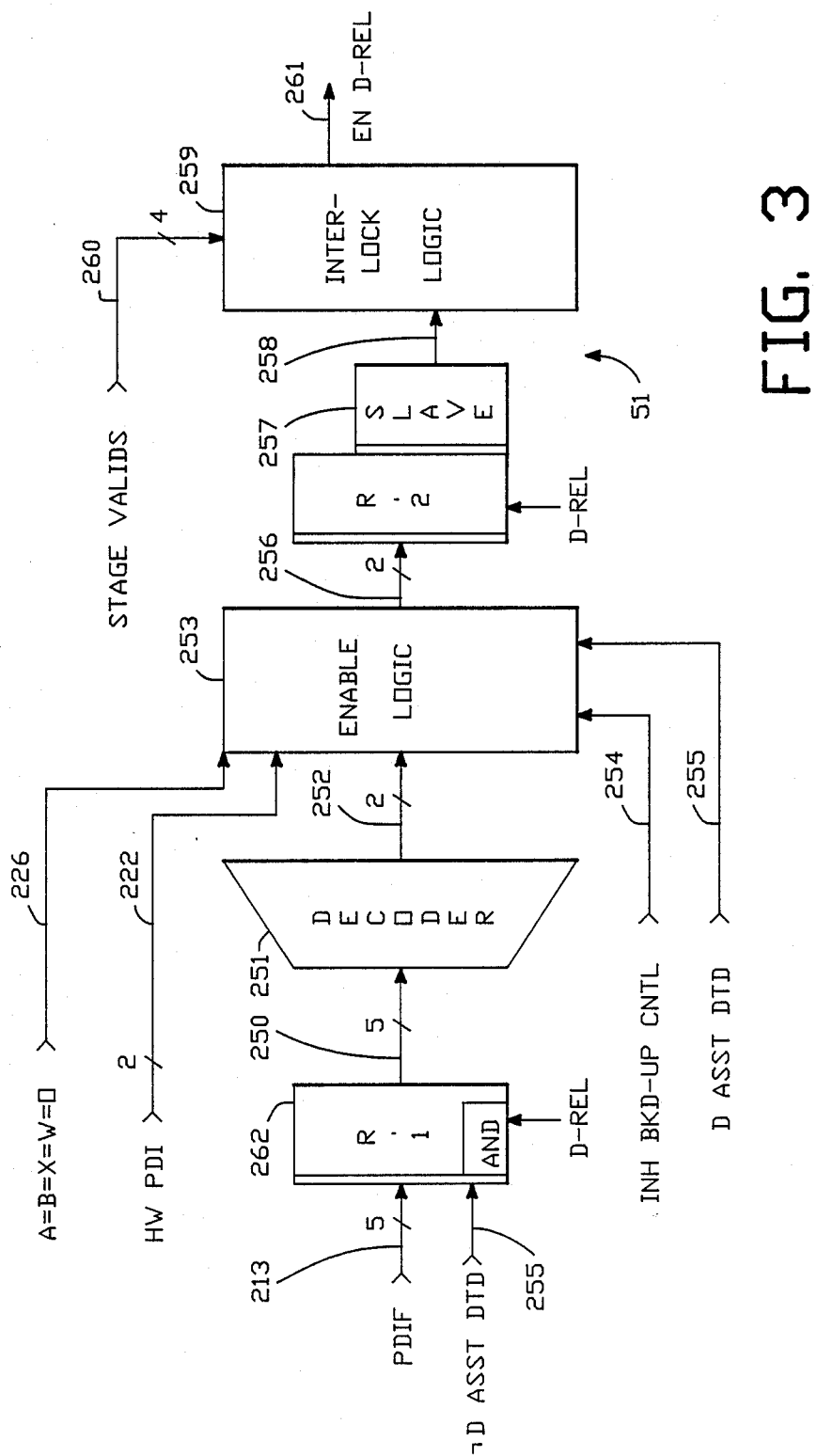
FIG. 3 is a block diagram of the pipeline delay interlock logic according to a preferred embodiment of the present invention.

FIG. 3 illustrates the implementation of the pipeline delay interlock logic 51. Inputs to the pipeline delay interlock logic 51 include the pipeline delay interlock field on line 213 and the hard wired pipeline delay interlock signals on line 222 and 226. The PDIF is a 5-bit code from the output of the control store RAM. The PDIF is received in the first register R1 in the pipeline delay logic 51. It is staged across line 250 to decoding logic 251. The output of the decoding logic is a 2-bit code on line 252 indicating the characteristic of the stage valid control signals from the various stages in the pipeline upon which the D release is to be enabled. The hard wired programmable delay interlock signal on line 222 is likewise a 2-bit code indicating a characteristic of the pipeline stage valid control signals at which the D release signal is to be enabled. The hardwired programmable delay interlock signal on line 226 also indicates a characteristic of the stage valid control signals of the various stages in the pipeline upon which the D-release is to be enabled. Both the code on line 252 and the HW PDI signal on line 222 are supplied to the interlock enable logic 253. Other inputs to the interlock enable logic include control signals from the instruction unit pipeline 12 such as inhibit backed-up control INH BKD-UP CNTL on line 254 or the D stage assist detected signal D ASST DTD on line 255. These are control signals indicating special pipeline conditions that will override the pipeline delay interlock.

The output of the enable logic is supplied as a 2-bit PDI code across line 256 to a second register R2 in the pipeline delay interlock logic 51. The second register R2 is also clocked by the D release signal and includes a slave register 257. The output of the slave register 257 is supplied on line 258 to the interlock logic 259. The interlock logic 259 also receives the stage valid control signals across line 260 from the valid logic in the instruction unit pipeline 12. The stage valid control signals on line 260 correspond to the signals supplied on lines 29, 36, 45 and 50 of FIG. 1. The output of the interlock logic 259 is the enable D release signal on line 261.

The preferred embodiment implements the microstore in the manner described in the above cross-referenced application entitled MICROSTORE STRUCTURE SUPPORTING BACKED-UP AND NORMAL MICROFIELDS. Further, the pipeline delay interlock field is implemented as a backed-up microfield. Thus, a control store address accessed during a first flow of the pipeline will provide the backed-up microfield containing a pipeline delay interlock field to register R1. A second flow of the pipeline will set the pipeline delay interlock logic through enable logic 253 and latch results in register R2. The dependent flow, or the third flow of the pipeline, will interlock in its D stage until the enable D release signal on line 261 is generated.

The backed-up microfield to implement the pipeline delay interlock is used in this implementation to meet a timing problem that exists because the register R1 and the decode logic 251 are located on a separate circuit board than the balance of the pipeline delay interlock logic. Because of the signal propagation time, the backed-up control is used to assure that no timing violations occur. Other implementations could avoid use of the backed-up control field by placing the relevant logic at locations with shorter propagation delays.

The PDIF on line 213 is latched in the register R1 only when the D assist detected signal D ASST DTD on line 255 is not asserted as indicated by the AND-gate symbol 262 in the register R1. A D ASST DTD signal indicates that the output of the control store is being overridden to accomplish a function outside the normal range of operations available to the control store RAM.

Thus, the pipeline delay interlock of the present invention is a microcode controlled interlock decoded via a backed-up microfield. It is used to delay the pipeline until specified stages are no longer valid as indicated by characteristics of the stage valid control signals on line 260. The characteristics decoded according to the present invention include the characteristics listed in Table 3.

TABLE 3

| | |
|---|---|
| (1) A = 0 | A cycle not valid |
| (2) A = B = 0 | A and B cycles not valid |
| (3) A = B = X = 0 | A, B and X cycles not valid |
| (4) A = B = X = W = 0 | A, B, X, and W cycles not valid |

The current implementation does not provide the A=B=X=W=0 condition decode via the HW A=B=X=W=0 line 226. Accordingly, the 2-bit PDI code can specify the desired characteristic of the stage valid control signals for the cases in Table 3, marked (1), (2) and (3).

The 5-bit microfield supplied on line 213 and the PDI code generated by the decode logic on line 252 are illustrated in Table 4 for each of the pipeline delay interlock characteristics.

TABLE 4

| Function | Microfield | PDI Code |
|---|---|---|
| A = 0 | 00001; 01001; | 01 |
| A = B = 0 | 11100; 11101; 00010; | 10 |
| A = B = X = 0 | 10001; 10111; 00011; 01011; | 11 |

The truth table for the enable logic 253 is shown in Table 5. Table 5 includes five columns: the first column labeled HWPDI"x", lists bit x of the 2-bit hard wired PDI signal on line 222; the second column labeled PCPDI"x" labels bit x of the output of the decoder 251 on line 252; the third column is the D cycle assist detected signal; the fourth column is the inhibit backed-up control signal; and, the fifth column labeled PDI"x" is bit x of the PDI code supplied at the output of the enable logic on line 256 to register R2 in the PDI logic 51.

TABLE 5

| HW PDI'X' | PC PDI'X' | D Asst DTD | INH Bckd Up Cntl | PDI Code'X' |
|---|---|---|---|---|
| 0 | 0 | 0 | 0 | 0 |
| 0 | 0 | 0 | 1 | 0 |
| 0 | 0 | 1 | 0 | 0 |
| 0 | 0 | 1 | 1 | 0 |
| 0 | 1 | 0 | 0 | 1 |
| 0 | 1 | 0 | 1 | 0 |
| 0 | 1 | 1 | 0 | 0 |
| 0 | 1 | 1 | 1 | 0 |
| 1 | 0 | 0 | 0 | 1 |

TABLE 5-continued

| HW PDI'X' | PC PDI'X' | D Asst DTD | INH Bckd Up Cntl | PDI Code'X' |
|---|---|---|---|---|
| 1 | 0 | 0 | 1 | 1 |
| 1 | 0 | 1 | 0 | 0 |
| 1 | 0 | 1 | 1 | 0 |
| 1 | 1 | 0 | 0 | 1 |
| 1 | 1 | 0 | 1 | 1 |
| 1 | 1 | 1 | 0 | 0 |
| 1 | 1 | 1 | 1 | 0 |

The interlock logic 259 truth table is provided in Table 6. The column labeled PDIcode is a signal supplied on line 258 from slave register 257. The A valid, B valid and X valid columns correspond to the stage valid signals supplied on lines 260 from the A stage, B stage and X state, respectively. Thus, the pipeline delay interlock is set as indicated by the PDI set column in response to the pipeline stage valid signals and the PDI code. The pipeline delay interlock is released only when the specified condition of the pipeline stage valid signals is reached.

TABLE 6

| Function | PDI Code | A Val | B Val | X Val | PDI Set |
|---|---|---|---|---|---|
| No delay | 00 | ∂ | ∂ | ∂ | 0 |
| A = 0 | 01 | 1 | ∂ | ∂ | 1 |
| A = B = 0 | 10 | 1 | 1 | ∂ | 1 |
| A = B = X = 0 | 11 | 1 | 1 | 1 | 1 |

(∂ = don't care)

The A=0 interlock is generally used to allow a B state operand address register to factor into a D stage operand address generation of a dependent flow. The A=B=0 interlock is generally used to have the operand data from a first flow held in the operand word register of the execution unit at the end of the B stage factor into the operand address generation in the D stage of a following operation. The A=B=X=0 interlock is generally used to provide the results of a first operation held in the result register of the execution unit at the end of the X stage to factor into the operand address generation in the D stage of a dependent flow.

Figure 4:
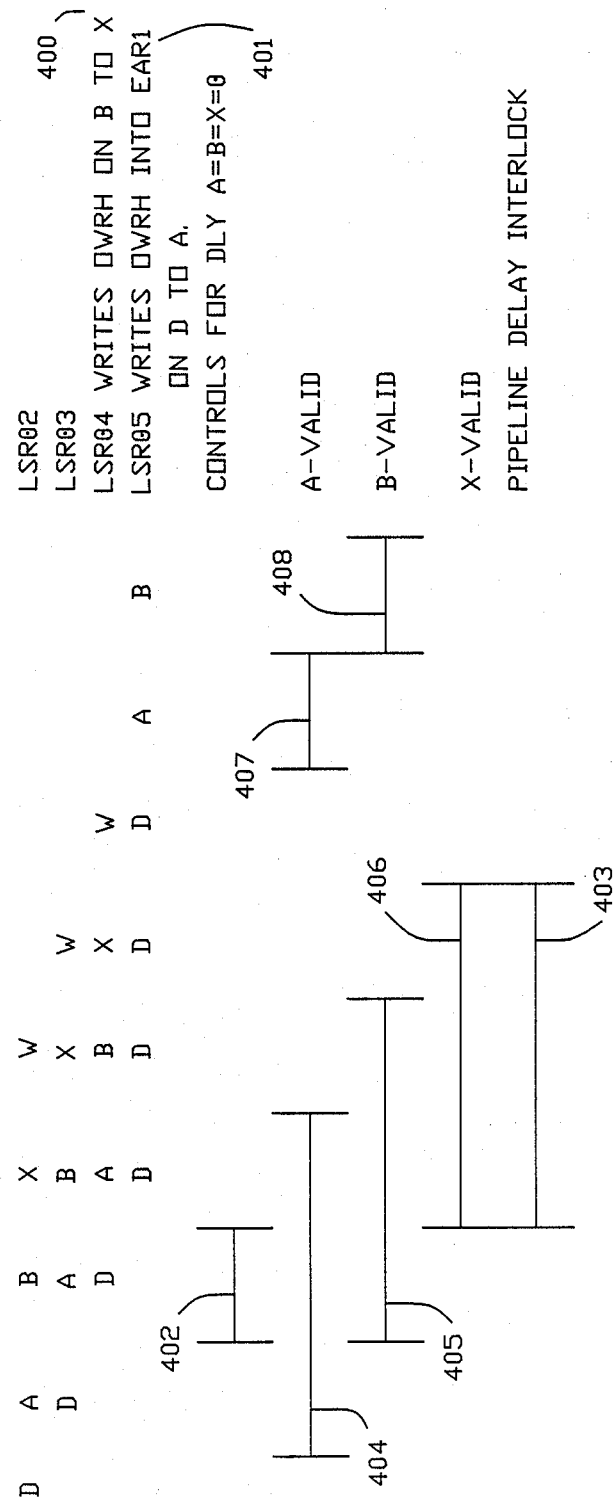
FIG. 4 is a pipeline diagram illustrating one example of the pipeline delay interlock.

An example of a stream of instructions implementing the pipeline delay interlock for the condition A=B=X=0 is shown in FIG. 4. In this example, the contents of a system register 4 SR04 are read in the flow LSR04 400 and placed in the operand word register for transfer to the execution unit on a change from the B stage to the X stage. In flow LSR05 401, the contents of the operand word register are sent to the storage unit by way of the effective address generating complex in the D stage of the pipeline. Accordingly, the LSR05 flow must interlock in the D stage to wait completion of the X stage of the LSR04 flow.

The pipeline delay interlock controls 402 are decoded in the D stage of the LSR03 flow and staged through the D stage of the LSR04 flow. The pipeline delay interlock 403 is set by the D stage LSR04 flow and continues until the A=B=X=0 condition is met. As can be seen, the A valid signal prior to the interlock 404, is asserted until the first interlock stage delay of the LSR05 flow. Likewise, the B valid signal 405 prior to the interlock, is asserted until the second stage delay from the interlock of the LSR05 flow. Further, the X valid signal 406 is asserted until the third stage delay of the LSR05 flow. During the fourth cycle of the interlock, the D release is enabled and LSR05 flow proceeds. Thus, A valid signal 407 after the interlock, is asserted in the following cycle and the B valid signal after the interlock 408, is asserted two cycles later.

Other example instructions are illustrated as follows:

TABLE 7

(1) 1——>DLY (A=0)

SSK02  | D | A | B | X | W |

1——>DLY(A=0)

SSK03  | D | D | A | B |
REIF               | D | A |

PURPOSE: Delay REIF flow until storage key in SSK02 flow is valid.

(2) 1——>DLY (A=B=0)

ISKE01 | D | A | B | X | W |

1——>DLY(A=B=0)

ISKE02 | D | D | D | A |

PURPOSE: Allows OWRH bypass from 01 to 02.

(3) 1——>DLY (A=B=X=0)

Mc01  | D | A | B | X | W |

1——>DLY(A=B=X=0)

MC02  | D | D | D | D | A |

PURPOSE: Allows XUCC, Set in MC01, to effect D of MC02.

In the first example, the storage key created in the SSK02 flow must be valid before the REIF flow can begin. A pipeline delay interlock of one stage is required to allow the output of the B stage of the SSK02 flow to be available to the D stage of the REIF flow. As can be seen, in this implementation, the interlock is effective on the intervening flow SSK03 but provides a delay needed by the dependent instruction REIF.

In the second example, the characteristic of the stage valid signals where A=B=0 is used to release the pipeline delay interlock. It is used in the case of the ISKE01 followed by an ISKE02 flow. This allows the data loaded in the operand word register at the end of the B cycle to be used in the D stage of the second flow.

In the third example, the characteristic of the stage valid control signals, where A=B=X=0 is used to release the interlock. This allows, in the example, a condition code set in the execution unit at the end of X stage of the MC01 flow to effect the D stage of the MC02 flow.

CONCLUSION

The present invention allows release of a pipeline stage to be dependent on the validity of other stages in the pipeline under microcode control. By using the stage valid signals and microcode control, a straightforward pipeline delay interlock of variable length can be implemented with minimal additional hardware and without wasting microstore locations. Further, the interlock is dependent only on conditions within the instruction unit pipeline which minimizes timing problems associated with prior art programmable delay interlocks.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

I claim:

1. In a data processing machine having an instruction processing unit including of stages in a pipeline configuration, having a pipeline offset of P, where P is a number of stages greater than or equal to 1, for executing a stream of instructions in which stage N is responsive to a stage release signal to release a current instruction and proceed with processing of a following instruction; in which the instruction processing unit includes validity logic generating stage valid control signals indicating current processing of a valid instruction in corresponding stages; and in which processing in the Nth stage of a dependent instruction is dependent is dependent on processing in the Mth stage of a previous instruction in the stream of instructions, where M−N is greater than P; an improvement comprising:
    release enabling means, in communication with the Nth stage and the validity logic and receiving a delay interlock signal, for enabling an Nth stage release signal in response to a characteristic of the stage valid control signals identified by the delay interlock signal; and
    interlock control means, responsive to prespecified instructions in the stream of instructions for generating the delay interlock signal.

2. The improvement of claim 1, wherein N equals one.

3. The improvement of claim 1, wherein P equals one.

4. The improvement of claim 1, wherein the delay interlock signal specifies one of a set of characteristics of the stages valid control signals.

5. The improvement of claim 4, wherein the set includes the characteristic that stage N+1 is not valid.

6. The improvement of claim 4, wherein the set includes the characteristic that stage N+1 and stage N+2 are not valid.

7. The improvement of claim 4, wherein the set includes the characteristic that stage N+1, stage N+2 and stage N+3 are not valid.

8. The improvement of claim 4, wherein the set includes the characteristic that stage N+1, stage N+2 and stage N+3 and stage N+4 are not valid.

9. In a data processing machine having an instruction processing unit including a plurality of stages in a pipeline configuration, having a pipeline offset of one, for executing a stream of instructions in which a first stage is responsive to a stage release signal to release a current instruction and proceed with processing of a following instruction; in which the instruction processing unit includes validity logic generating stage valid control signals indicating current processing of a valid instruction in corresponding stages; and in which processing in the first stage of a dependent instruction is dependent on processing in the Mth stage of a previous instruction in the stream of instructions where M−1 is greater than one; an apparatus providing microprogrammable pipeline delay interlocks comprising:
    decoding means, receiving instructions in the stream of instructions for decoding an instruction to generate a microprogram instruction including a pipeline delay interlock field for a subsequent instruction in the instruction stream;
    interlock control means, responsive to the pipeline delay interlock field, for generating a delay interlock signal identifying a characteristic of the stage valid control signals; and
    release enabling means, in communication with the first stage and the validity logic and receiving the delay interlock signal, for enabling a first stage release signal in response to the delay interlock signal.

10. The apparatus of claim 9, wherein the subsequent instruction is dependent on the processing in the Mth stage of the instruction that includes the pipeline delay interlock field.

11. The apparatus of claim 9, wherein the subsequent instruction is dependent on the processing in the Mth stage of the instruction that follows the instruction including the pipeline delay interlock field.

12. The apparatus of claim 9, wherein the delay interlock signal specifies one of a set of characteristics of the stage valid control signals.

13. The apparatus of claim 12, wherein the set includes the characteristic that the second stage is not valid.

14. The apparatus of claim 12, wherein the set includes the characteristic that the second stage and the third stage are not valid.

15. The apparatus of claim 12, wherein the set includes the characteristic that the second stage, third stage and fourth stage are not valid.

16. The apparatus of claim 12, wherein the set includes the characteristic that the third stage, fourth stage and fifth stage are not valid.

17. The apparatus of claim 9, wherein the decoding means further includes hard wired means for generating a pipeline delay interlock code in response to instructions and the interlock control means is responsive to the pipeline delay interlock code and the pipeline delay interlock field.

18. The apparatus of claim 9, wherein the decoding means includes a programmable control store supplying microprogram instructions.

* * * * *